Mar. 6, 1923.

C. W. OLMSTEAD.
NUT LOCK.
FILED MAR. 17, 1922.

1,447,811.

Inventor
Charles W. Olmstead

By C. E. Shepherd
Attorney

Patented Mar. 6, 1923.

1,447,811

UNITED STATES PATENT OFFICE.

CHARLES W. OLMSTEAD, OF COLUMBUS, OHIO.

NUT LOCK.

Application filed March 17, 1922. Serial No. 544,418.

*To all whom it may concern:*

Be it known that CHARLES W. OLMSTEAD, a citizen of the United States, residing at Columbus, in the county of Franklin and State of Ohio, has invented certain new and useful Improvements in Nut Locks, of which the following is a specification.

The present invention is directed to improvements in nut locks, and has for its primary object to provide a device of this character, constructed in such a manner that the nut can be locked in tight engagement with the bolt to prevent relative movement thereof, and consequently to eliminate the accidental disengagement of the nut from the bolt.

A further object of the invention is to provide a novel form of locking yoke, which has cooperating therewith a plug capable of warping or expanding the locking yoke so that it will be forced into engagement with the threads of the nut to prevent accidental rotation of the nut, the plug being retained in locking engagement with the yoke and also in threaded engagement with threads formed interiorly of the bolt.

With these and other objects in view, as will appear as the description proceeds, the invention consists in the novel feature of construction, combinations of elements and arrangements of parts, as hereinafter to be fully described and pointed out in the appended claims.

Figure 1:
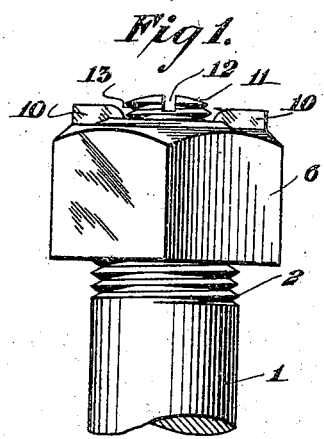
Figure 1 is a side elevation of the device.

Referring to the drawing, 1 designates the bolt which is provided with threads 2 for a portion of its length. The bolt is provided with a central bore 3, said bore being provided with interior threads 4. The threaded portion of the bolt is further provided with oppositely disposed longitudinal slots 5, the purpose of which will appear later.

The nut 6 is threaded upon the bolt 1 and when in place thereon will close the outer ends of the slots 5, and since the threads of the nut transverse these slots they will be arranged in a position to be engaged by the locking yoke, in a manner to be herein described.

The locking yoke 7 has its side arms 8 provided exteriorly with tapered longitudinally extending teeth 9. The upper ends of the arms 8 terminate in outwardly directed lugs 10, the purpose of which will appear later.

The plug 11 is provided, said plug being of such diameter that it will engage snugly within the bore 3, said plug having a groove 12 formed in its upper end for the application of a screw driver or the like, to facilitate the rotation of the plug when screwing it into or out of the bore 3, said plug being provided with threads 13 for engagement with the threads 4 of said bore.

Figure 2:
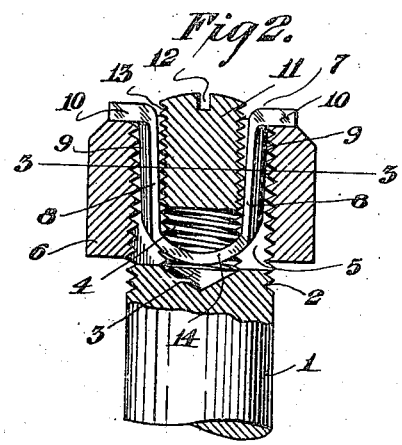
Figure 2 is a longitudinal sectional view through the device and a portion of the bolt.
Figure 3:
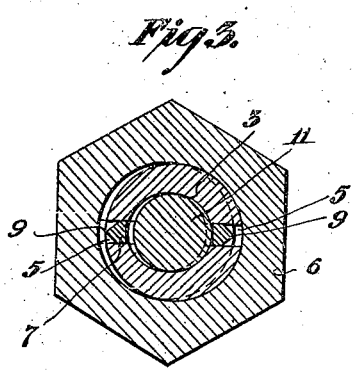
Figure 3 is a sectional view on line 3—3 of Figure 2.
Figure 4:
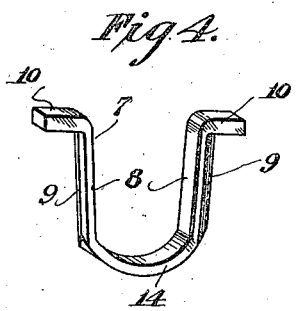
Figure 4 is a perspective view of the locking yoke.

To lock the nut 6 with the bolt 1, said nut is screwed thereon, after which the locking yoke 7 is forced into the bore 3, and at which time the arms 8 thereof will engage in the slots 5, and since the arms are convergingly arranged it will be apparent that the teeth 9 carried thereby will firmly engage certain of the threads of the nut. The downward movement of the locking yoke 7 is limited by the lugs 10 which engage the upper surface of the nut, as clearly shown in Figure 2 of the drawing. After the locking yoke has been properly engaged within the bore 3 the plug 11 is placed in threaded engagement with the bore 3, and as this plug is screwed downwardly the threads 13 thereof will engage the inner surfaces of the arms 8 and will cause the same to flex slightly so that the teeth will bite into the threads of the nut 6, and since the threads of the plug are engaged with the threads 4 of the bore 3 and also with the arms 8 of the yoke 7, it will be obvious that these members will be firmly locked, thus preventing accidental rotation of the nut 6. It will be further noted that the bight portion 14 of the yoke 7 will readily permit the arms 8 to spread, thereby permitting the teeth 9 carried thereby to be forced outwardly in the slots 5 and into biting engagement with the nut 6. Since the arms 8 are convergingly arranged it will be apparent that as the plug 11 is screwed inwardly to a limited distance that the arms 8 will spread outwardly to cause the teeth 9 to bite into the threads of the nut 6. It will be of course understood that the yoke 7 is formed from metal which is sufficiently resilient to permit the expansion and contraction thereof.

What I claim is:

1. In a nut lock, the combination with a bolt having threaded bore formed therein, of a locking yoke removably engaged in the bore, the arms of the locking yoke being convergingly arranged, a nut engaged on a bolt a plug for engaging the bore, the arms of the yoke being forced into engagement with the threads of the nut when the plug is engaged in said bore.

2. In a nut lock, the combination with a bolt having a longitudinal threaded bore formed therein, of a nut engaged on the bolt, a locking yoke removably engaged in said bore and having lugs carried by its arms for engaging the upper surface of the nut, the arms of said yoke being convergingly arranged, and a plug adapted to be threaded into said bore and in engagement with the arms of the locking yoke for causing said arms to flex for engagement with the threads of the nut.

3. In a nut lock, the combination with a bolt having a longitudinal bore formed therein, of a nut in threaded engagement with the bolt, said bolt having oppositely disposed slots formed longitudinally therein and opening into said bore, a locking yoke removably engaged in said bolt and having its arms convergingly arranged and disposed in said slots, a plug threaded in the bore for engaging the arms of the locking yoke, said arms having teeth formed thereon for engagement with the threads of the nut when the plug is screwed into said bore.

In testimony whereof I affix my signature.

CHARLES W. OLMSTEAD.